(12) United States Patent
Huang et al.

(10) Patent No.: US 6,814,456 B1
(45) Date of Patent: Nov. 9, 2004

(54) BACK LIGHT MODULE

(75) Inventors: Hua-Nan Huang, Miao-Li Hsien (TW);
Che-Kuei Mai, Hsin-Chu (TW)

(73) Assignee: Toppoly Optoelectronics Corp.,
Miao-Li Hsien (TW)

( * ) Notice: Subject to any disclaimer, the term of this patent is extended or adjusted under 35 U.S.C. 154(b) by 0 days.

(21) Appl. No.: 10/249,889

(22) Filed: May 15, 2003

(51) Int. Cl.[7] .......................... F21V 13/12; F21V 29/00
(52) U.S. Cl. .................... 362/30; 362/218; 362/224; 362/245; 362/246; 362/247; 362/330; 362/345
(58) Field of Search .................... 362/30, 29, 218, 362/224, 225, 245–248, 294, 330, 345, 26, 31, 27, 351, 559, 355, 558

(56) References Cited

U.S. PATENT DOCUMENTS

| | | | | |
|---|---|---|---|---|
| 4,642,736 A | * | 2/1987 | Masuzawa et al. | 362/31 |
| 4,738,042 A | * | 4/1988 | Corden et al. | 40/472 |
| 4,860,171 A | * | 8/1989 | Kojima | 362/31 |
| 5,730,484 A | * | 3/1998 | Robinson | 296/97.6 |
| 5,961,197 A | * | 10/1999 | Watai et al. | 362/31 |
| 6,527,426 B2 | * | 3/2003 | Oyama et al. | 362/517 |
| 2003/0086265 A1 | * | 5/2003 | Ilsaka et al. | 362/268 |

* cited by examiner

*Primary Examiner*—Alan Cariaso
*Assistant Examiner*—Mark Tsidulko
(74) *Attorney, Agent, or Firm*—Winston Hsu

(57) ABSTRACT

A back light module disposed under a display panel has at least a light source generator for generating light beams, a diffusing plate for scattering the light beams to the display panel, a light guide plate for scattering the light beams to the diffusing plate, at least a light shading sheet with a plurality of light holes, and a reflecting sheet for scattering the light beams to the light guide plate.

14 Claims, 3 Drawing Sheets

BACK LIGHT MODULE

BACKGROUND OF INVENTION

1. Field of the Invention

The present invention relates to a back light module, and more specifically, to a back light module for preventing light bleed-through phenomenon.

2. Description of the Prior Art

Backlight units are known in the art. The backlight unit, which is a key element in the fabrication of liquid crystal displays, is widely used in digital cameras, PDAs, vehicle satellite navigation systems, computer monitors, flat panel TVs and so on. Typically, a backlight unit, which is generally installed underneath a display panel, comprises a light source (or multiple light sources) and a light diffusion means for providing users and consumers with diffused, ample, and comfortable backlighting. Light penetrates the overlying display panel and forms various images controlled by pixel electrodes densely arranged on the display panel. Backlight units are typically divided into two major categories: edge light type and direct-type, wherein the direct-type backlight unit can provide higher intensity of light and is thus more suited for large size display panels, such as display panels or TV panels, than the edge light type.

Please refer to FIG. 1 of a cross-sectional view of a back light module 10 according to the prior art. As shown in FIG. 1, the back light module 10 is disposed under a display panel 12 and comprises at least one light source generator 14, a diffusing plate 16 disposed between the light source generator 14 and the display panel 12, a light guide plate (LGP) 18 disposed between the light source generator 14 and the diffusing plate 16, and a reflecting sheet 20 disposed under the light source generator 14 and fixed on a housing 22.

The light source generator 14 is utilized for providing a light source, and the reflecting sheet is utilized for upwardly reflecting the light source generated by the light source generator 14 and thereby increase the light use efficiency of the back light module 10. The light guide plate 18 is utilized for scattering the light source to the diffusing plate 16, and the diffusing plate 16 is employed for further scattering the light source to the display panel 12. The housing 22 disposed under the reflecting sheet 20 is utilized to assemble the diffusing plate 16, the light guide plate 18, the reflecting sheet 20 and the light source generator 14. In addition, the diffusing plate 16 further comprises at least one prism 24 disposed on a surface of the diffusing plate 16 to reduce the difference of the luminous intensities on the display panel 12 in advance. The quantity and placing order of the prism 24 employed are defined by the specification of the back light module 10.

Generally, the light source generator 14 is a cold cathode fluorescent lamp (CCFL), and the plurality of the light source generator 14 is arranged in parallel. As technologies progress, the brightness of the light source generators 14 turns to be higher and higher due to market demand. However, the improved brightness of the light source generator 14 frequently causes light gratings appeared on the display panel 12, leading to the unbalanced brightness of the display panel 12, which is called a light bleed-through phenomenon. Moreover, this light bleed-through phenomenon would cause defective display function of the display panel 12 under the long-time operation of the back light module 10, making the back light module 10 a less-competitive product.

SUMMARY OF INVENTION

It is therefore a primary object of the present invention to provide a back light module to prevent the defective function of the back light module caused by the light bleed-through phenomenon described in the prior art.

According to the claimed invention, the back light module is disposed under a display panel and comprises a diffusing plate, at least one light source generator, a prism, a light guide plate (LGP), at least one light shading sheet, and a reflecting sheet. The light source generator is utilized for generating a light source, and the diffusing plate is disposed between the light source generator and the display panel. The prism is disposed on a surface of the diffusing plate, and the light guide plate is disposed between the light source generator and the diffusing plate. The light guide plate is utilized for scattering the light source to the diffusing plate, and the diffusing plate is utilized for scattering the light source to the display panel. The reflecting sheet is disposed under the light source generator and is utilized for upwardly reflecting the light source to the light guide plate. The light shading sheet is a semi-transparent sheet disposed between the light source generator and the light guide plate and comprises a plurality of light holes.

It is an advantage of the present invention against the prior art that the light source in the present invention is generated by the light source generator and then scattered through a plurality of light holes of the light shading sheet to the light guide plate, assuring an uniform brightness of the scattered light source and thus preventing the light bleed-through phenomenon. Alternatively, the light holes can be neglected in case that the light shading sheet is composed of a semi-transparent sheet for the simplification of the manufacturing processes of the back light module. Consequently, the display quality of the back light module is assured by the use of the light shading sheet, making the back light module a more competitive product.

These and other objectives of the present invention will no doubt become obvious to those of ordinary skill in the art after reading the following detailed description of the preferred embodiment, which is illustrated in the multiple figures and drawings.

DETAILED DESCRIPTION

Figure 1:
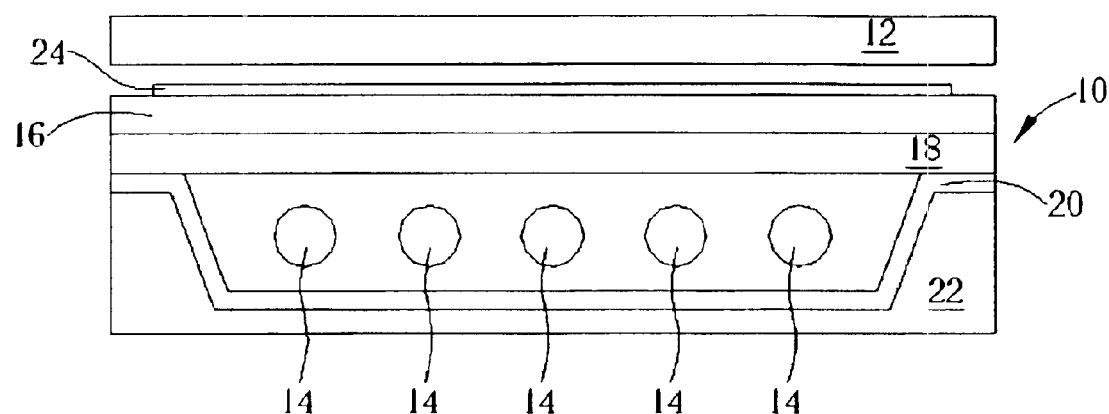
FIG. 1 is a cross-sectional view of a back light module according to the prior art.
Figure 2:
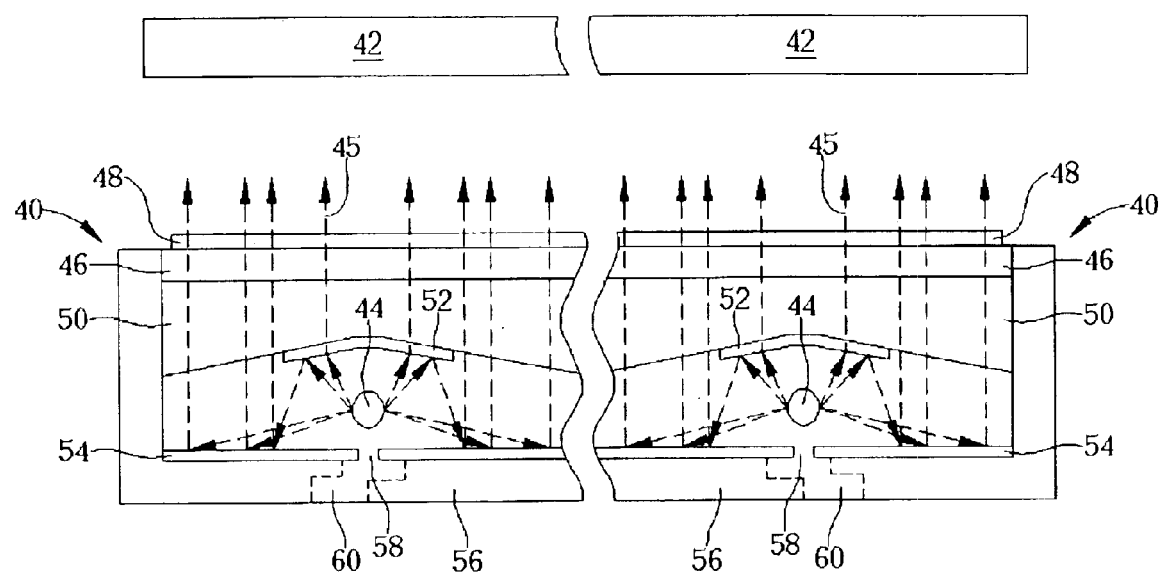
FIG. 2 is the cross-sectional view of a back light module according to the present invention.

Please refer to FIG. 2 of a cross-sectional view of a back light module 40 according to the present invention. As shown in FIG. 2, the back light module 40 is disposed under a display panel 42 and comprises at least one light source generator 44, a diffusing plate 46 disposed between the light source generator 44 and the display panel 42, at least one prism 48 disposed on a surface of the diffusing plate 46, a light guide plate (LGP) 50 disposed between the light source generator 44 and the diffusing plate 46, at least on light shading sheet 52 disposed between the light source generator 44 and the light guide plate 50, a reflecting sheet 54 disposed under the light source generator 44, and a housing 56 disposed under the reflecting sheet 54 for surrounding the reflecting sheet 54.

As shown in FIG. 2, the light source generators 44 are lamps utilized for providing a light source 45 and are arranged in parallel. In the preferred embodiment of the present invention, each light source generator 44 is a cold cathode fluorescent lamp (CCFL). The reflecting sheet 54, composed of either aluminum (Al) or metal alloy, comprises at least one opening 58, which is capable of dissipating heat generated during the operation of the back light module 40, and is utilized for reflecting the light source 45 to the light shading sheet 52 and further to the light guide plate 50. Alternatively, in another embodiment of the present invention, the reflecting sheet 54 is composed of a stacked film, comprising an upper sheet composed of either a metal sheet or other materials having a high light transmission ratio and a bottom sheet composed of either foamed polyethylene terephthalate (foamed PET) or polycarbonate (PC).

The light guide plate 50 is utilized for scattering the light source 45 generated by the light source generator 44 to the diffusing plate 46, and the diffusing plate 46 is utilized for further scattering the light source 45 to the display panel 42. In the preferred embodiment of the present invention, the light shading sheet 52 and the light guide plate 50 are simultaneously formed by an injection molding method. Alternatively, the light shading sheet 52 and the light guide plate 50 are separately formed and are then combined by an adhesion glue. The prism 48 disposed on the diffusing plate 46 is employed to reduce the difference of the luminous intensities on the display panel 42 in advance, and the quantity and placing order of the prism 48 employed are defined by the specification of the back light module 40. The housing 56 comprises a plurality of heat vents 60 to reinforce the heat dissipation of the back light module 40 during operation.

Figure 3:
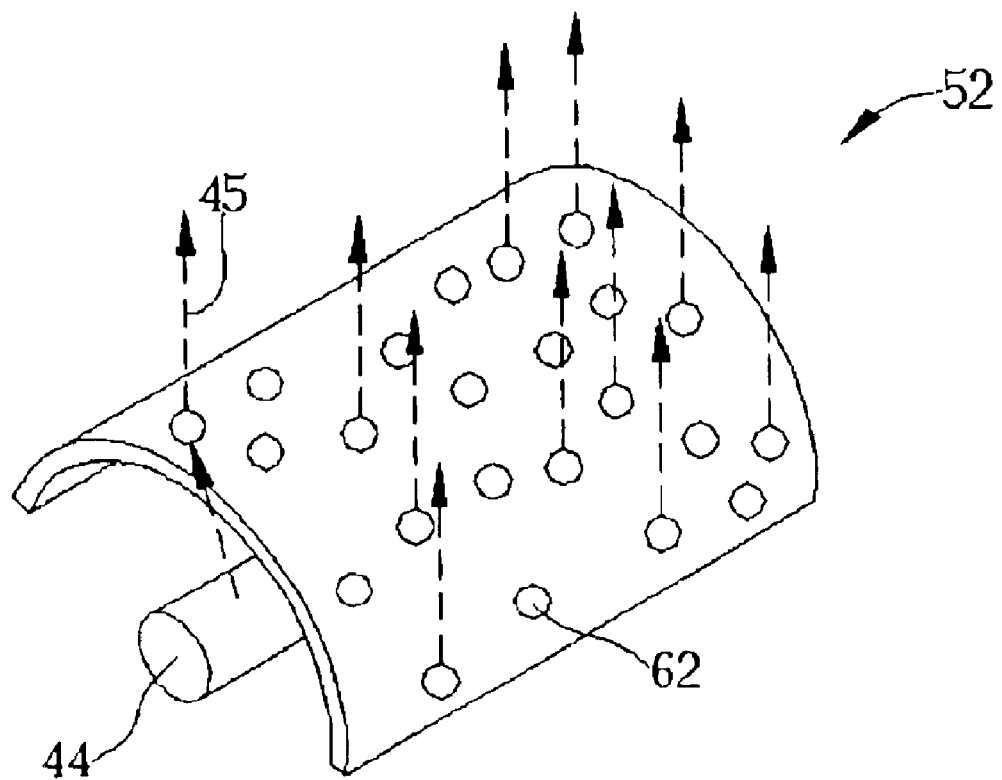
FIG. 3 is an enlarged schematic view of the light shading sheet 52 in FIG. 2.

Please refer to FIG. 3 of an enlarged schematic view of the light shading sheet 52 shown in FIG. 2. As shown in FIG. 3, the light shading sheet 52 has an arc shape and is capable of covering the plurality of the light source generators 44, and the light guide plate 50 has a curved shape corresponding to the arc shape of the light shading sheet 52. In addition, the light shading sheet 52 comprises a plurality of light holes 62 for the scattering of the light source 45 either generated by the light source generator 44 or reflected by the reflecting sheet 54 through the path marked by the arrows shown in FIG. 3 to the light guide plate 50. Normally, the light shading sheet 52 is composed of either a semi-transparent sheet or a metal sheet. In case that the light shading sheet 52 is composed of a semi-transparent sheet, the plurality of light holes 62 can be neglected for the transparency of the semi-transparent sheet. Alternatively, the light shading sheet 52 is further employed as a reflecting film for reflecting the light source 45 generated by the light source generator 44 to the reflecting sheet 54 in case that the light shading sheet 52 is composed of a metal sheet. The reflected light source 45 is then further reflected by the reflecting sheet 54 upwardly through the path shown by the arrows in FIG. 2 to the light guide plate 50.

As mentioned in preceding paragraphs in the prior art, the brightness of light source generators is much improved as technologies progress due to market demand, frequently leading to light gratings appeared on the display panel during the operation of the back light module, which is called light bleed-through phenomenon, due to the unbalanced brightness of the light source generated by the light source generators. The light shading sheet 52 is therefore revealed in the present invention to prevent the light bleed-through phenomenon. In comparison with the light source in the prior art, the light source 45 in the present invention is generated by the light source generator 44 and then scattered through the light holes 62 of the light shading sheet 52 to the light guide plate 50, assuring an uniform brightness of the scattered light source 45 and thus preventing the light bleed-through phenomenon. Alternatively, the light holes 62 can be neglected in case that the light shading sheet 52 is composed of a semi-transparent sheet for the simplification of the manufacturing processes of the back light module 40. Consequently, the display quality of the back light module 40 is assured by the use of the light shading sheet 52, making the back light module 40 a more competitive product.

Those skilled in the art will readily observe that numerous modifications and alterations of the device may be made while retaining the teachings of the invention. Accordingly, the above disclosure should be construed as limited only by the metes and bound of the appended claims.

What is claimed is:

1. A direct-type back light module disposed under a display panel comprising:
    at least one direct-type light source generator for providing light;
    a diffusing plate disposed between the direct-type light source generator and the display panel for scattering light to the display panel;
    a prism disposed on a surface of the diffusing plate;
    a light guide plate disposed between the direct-type light source generator and the diffusing plate for scattering light to the diffusing plate;
    at least one light shading sheet disposed between the direct-type light source generator and the light guide plate, the light shading sheet comprising a plurality of light holes; and
    a reflecting sheet disposed under the direct-type light source generator for reflecting light to the light guide plate.

2. The direct-type back light module of claim 1 wherein the direct-type back light module further comprises a housing disposed under the reflecting sheet to surround the reflecting sheet.

3. The direct-type back light module of claim 1 wherein the reflecting sheet comprises at least one opening for dissipating heat during the operation of the direct-type back light module.

4. The direct-type back light module of claim 1 wherein the direct-type light source generator is a lamp.

5. The direct-type back light module of claim 4 wherein the lamps are arranged in parallel.

6. The direct-type back light module of claim 1 wherein the light shading sheet is an arc-shaped sheet.

7. The direct-type back light module of claim 6 wherein the light shading sheet is a semi-transparent sheet.

8. The direct-type back light module of claim 6 wherein the light shading sheet is a reflecting film for reflecting light to the reflecting sheet, and further reflecting light to the light guide plate through the reflecting sheet.

9. The direct-type back light module of claim 8 wherein the reflecting film is a metal sheet.

10. A direct-type back light module disposed under a display panel comprising:
    at least one direct-type light source generator for generating light;
    a diffusing plate disposed between the direct-type light source generator and the display panel for scattering light to the display panel;
    a prism disposed on a surface of the diffusing plate;
    a light guide plate disposed between the direct-type light source generator and the diffusing plate for scattering light to the diffusing plate;
    at least one arc-shaped light shading sheet disposed between the direct-type light source generator and the light guide plate;
    a reflecting sheet disposed under the direct-type light source generator for reflecting light to the light guide plate; and
    a housing disposed under the reflecting sheet for surrounding the reflecting sheet.

11. The direct-type back light module of claim 10 wherein the reflecting sheet comprises at least one opening for dissipating heat during the operation of the direct-type back light module.

12. The direct-type back light module of claim 10 wherein the direct-type light source generator is a lamp.

13. The direct-type back light module of claim 12 wherein the lamps are arranged in parallel.

14. The direct-type back light module of claim 10 wherein the light shading sheet is a semi-transparent sheet.

* * * * *